US010747401B2

(12) United States Patent
Kuscher et al.

(10) Patent No.: US 10,747,401 B2
(45) Date of Patent: Aug. 18, 2020

(54) UNIFIED AND SMART NOTIFICATIONS AND QUICK SETTINGS SYSTEM

(71) Applicant: GOOGLE LLC, Mountain View, CA (US)

(72) Inventors: Alexander Friedrich Kuscher, San Francisco, CA (US); Sebastien Vincent Gabriel, San Francisco, CA (US); Jennifer Chen, San Francisco, CA (US)

(73) Assignee: Google LLC, Mountain View, CA (US)

( * ) Notice: Subject to any disclaimer, the term of this patent is extended or adjusted under 35 U.S.C. 154(b) by 650 days.

(21) Appl. No.: 15/381,276

(22) Filed: Dec. 16, 2016

(65) Prior Publication Data

US 2018/0095611 A1 Apr. 5, 2018

Related U.S. Application Data

(63) Continuation-in-part of application No. 29/580,048, filed on Oct. 5, 2016, now Pat. No. Des. 839,896.

(51) Int. Cl.
*G06F 3/0482* (2013.01)
*G06F 3/048* (2013.01)
(Continued)

(52) U.S. Cl.
CPC ............ *G06F 3/0482* (2013.01); *G06F 3/048* (2013.01); *G06F 3/04847* (2013.01);
(Continued)

(58) Field of Classification Search
CPC ..... G06F 3/0482; G06F 3/048; G06F 3/04847
(Continued)

(56) References Cited

U.S. PATENT DOCUMENTS

D526,323 S 8/2006 McDougall et al.
D640,278 S 6/2011 Woo
(Continued)

OTHER PUBLICATIONS

International Search Report and Written Opinion for International Application No. PCT/US2017/054033 dated Dec. 20, 2017. 14 pages.

*Primary Examiner* — Stephen S Hong
*Assistant Examiner* — Hope C Sheffield
(74) *Attorney, Agent, or Firm* — Botos Churchill IP Law

(57) ABSTRACT

A user device incorporates a user interface platform that combines user notifications and various operational settings as part of a common display region. The notifications and settings are separated from one another, and the user interface dynamically adjusts the arrangement of these features to make it convenient for a user to quickly see the information and to manage it. The setting information may incorporate user logins, network and communication data, display and audio information, as well as other settings. And the application-related notifications may include information about active applications such as an email account, audio or video calls, texting apps, social media platforms, calendars, music players, video players, and the like. In response to a new notification, the system may consolidate the operational settings into core settings information. The system may also auto collapse (or expand) the notification list when a new notification is received.

16 Claims, 17 Drawing Sheets

(51) Int. Cl.
*G06F 3/0484* (2013.01)
*G06F 3/0488* (2013.01)
*H04M 1/725* (2006.01)
*G06F 1/16* (2006.01)

(52) U.S. Cl.
CPC ........ *G06F 1/1694* (2013.01); *G06F 3/04886* (2013.01); *G06F 2200/1614* (2013.01); *H04M 1/72583* (2013.01)

(58) Field of Classification Search
USPC ........................................................ 715/779
See application file for complete search history.

(56) References Cited

U.S. PATENT DOCUMENTS

| | | | |
|---|---|---|---|
| D747,327 S | 1/2016 | Virk et al. | |
| D747,726 S | 1/2016 | Virk et al. | |
| D748,103 S | 1/2016 | Virk et al. | |
| D749,104 S | 2/2016 | Kim et al. | |
| D756,370 S | 5/2016 | Arriola et al. | |
| D757,032 S | 5/2016 | Sabia et al. | |
| D760,248 S | 6/2016 | Suarez | |
| D760,747 S | 7/2016 | Gehiere et al. | |
| 9,400,599 B2 | 7/2016 | Park et al. | |
| D762,714 S | 8/2016 | Choi et al. | |
| D764,527 S | 8/2016 | Choi et al. | |
| D768,154 S | 10/2016 | Kim et al. | |
| D769,903 S | 10/2016 | Gomez | |
| D770,475 S | 11/2016 | Choi et al. | |
| D771,654 S | 11/2016 | Chaudhri et al. | |
| D772,250 S | 11/2016 | Kohan et al. | |
| D774,078 S | 12/2016 | Kisselev et al. | |
| D775,143 S | 12/2016 | Vazquez et al. | |
| D781,877 S | 3/2017 | Ko et al. | |
| D783,036 S | 4/2017 | Yang et al. | |
| D788,156 S | 5/2017 | Bachman et al. | |
| D790,574 S | 6/2017 | Anzures et al. | |
| D796,536 S | 9/2017 | Kim et al. | |
| D797,120 S | 9/2017 | Kim et al. | |
| D797,121 S | 9/2017 | Tegethoff | |
| D797,126 S | 9/2017 | Broughton et al. | |
| D797,774 S | 9/2017 | Park et al. | |
| D803,853 S | 11/2017 | Zhang et al. | |
| D803,865 S | 11/2017 | Nedelka et al. | |
| D809,002 S | 1/2018 | Chen | |
| D810,765 S | 2/2018 | Ross et al. | |
| D823,867 S | 7/2018 | Berlow | |
| D823,871 S | 7/2018 | Verdu Orts et al. | |
| D826,968 S | 8/2018 | Varshavskaya et al. | |
| 2008/0126958 A1 | 5/2008 | Louie | |
| 2010/0088639 A1* | 4/2010 | Yach | G06F 1/1626 715/825 |
| 2012/0124523 A1* | 5/2012 | Zhang | G06F 3/0482 715/841 |
| 2014/0108995 A1* | 4/2014 | Sandler | G06F 3/0481 715/781 |
| 2014/0365912 A1* | 12/2014 | Shaw | G06F 3/04817 715/748 |
| 2015/0082251 A1* | 3/2015 | Lam | G06F 16/955 715/843 |
| 2015/0153571 A1* | 6/2015 | Ballard | H04W 76/10 345/8 |
| 2015/0169146 A1* | 6/2015 | Lalwani | G06F 3/0482 715/811 |
| 2015/0185979 A1 | 7/2015 | Zhang et al. | |
| 2015/0249733 A1 | 9/2015 | Miura | |
| 2016/0132192 A1 | 5/2016 | Sutton et al. | |

\* cited by examiner

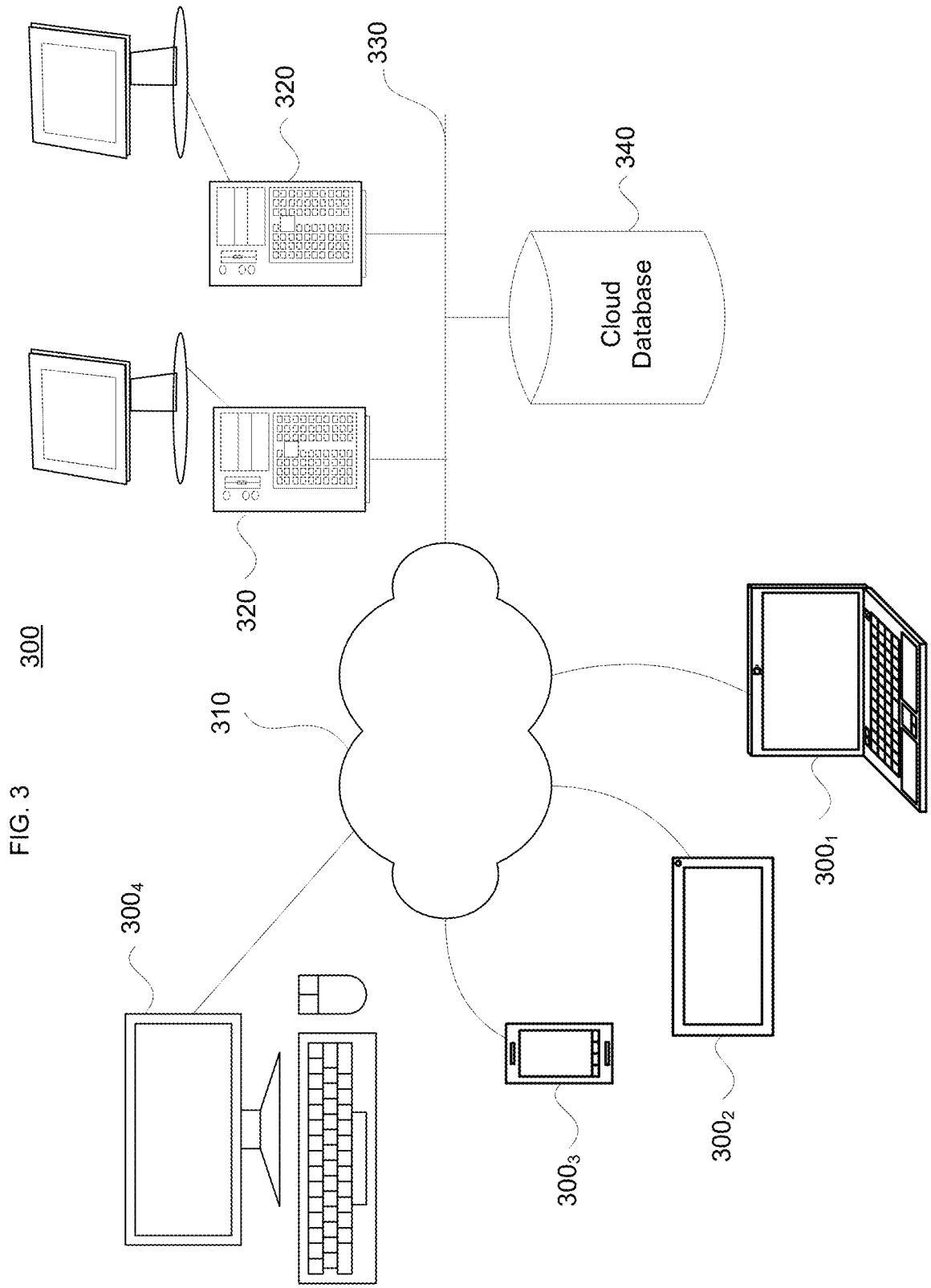

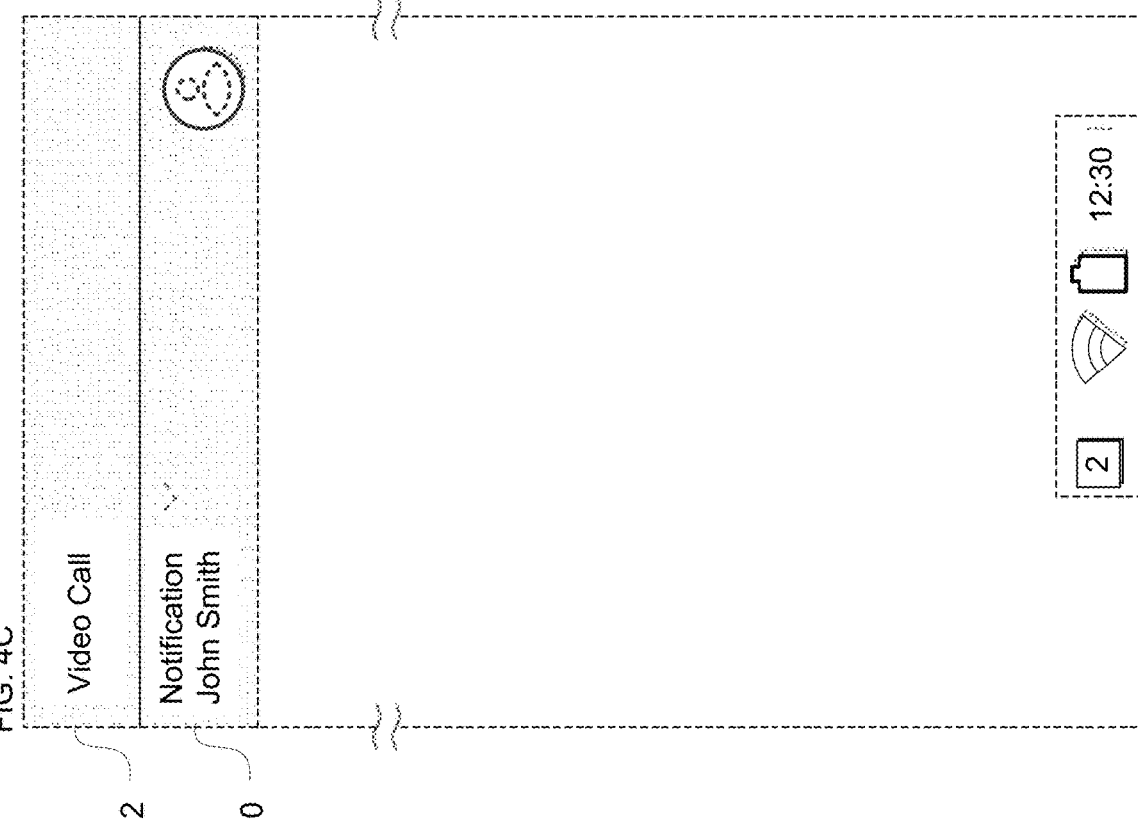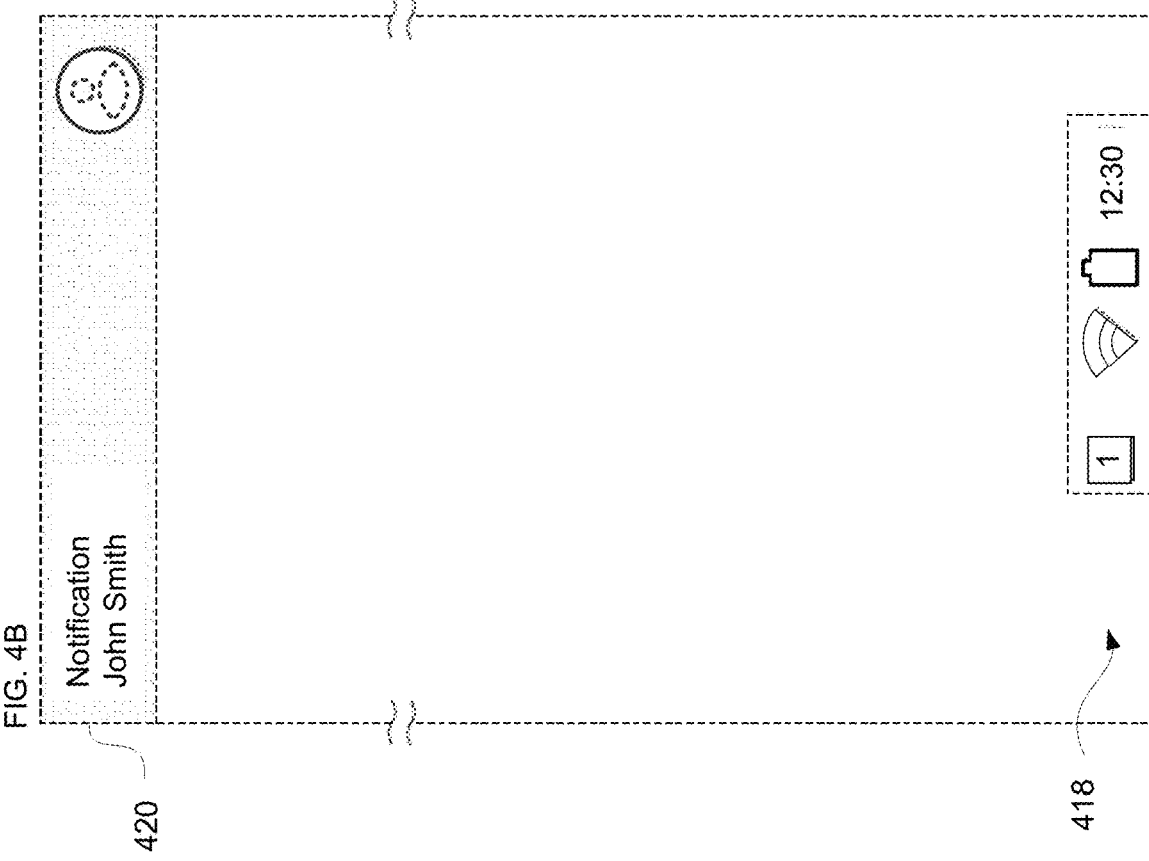

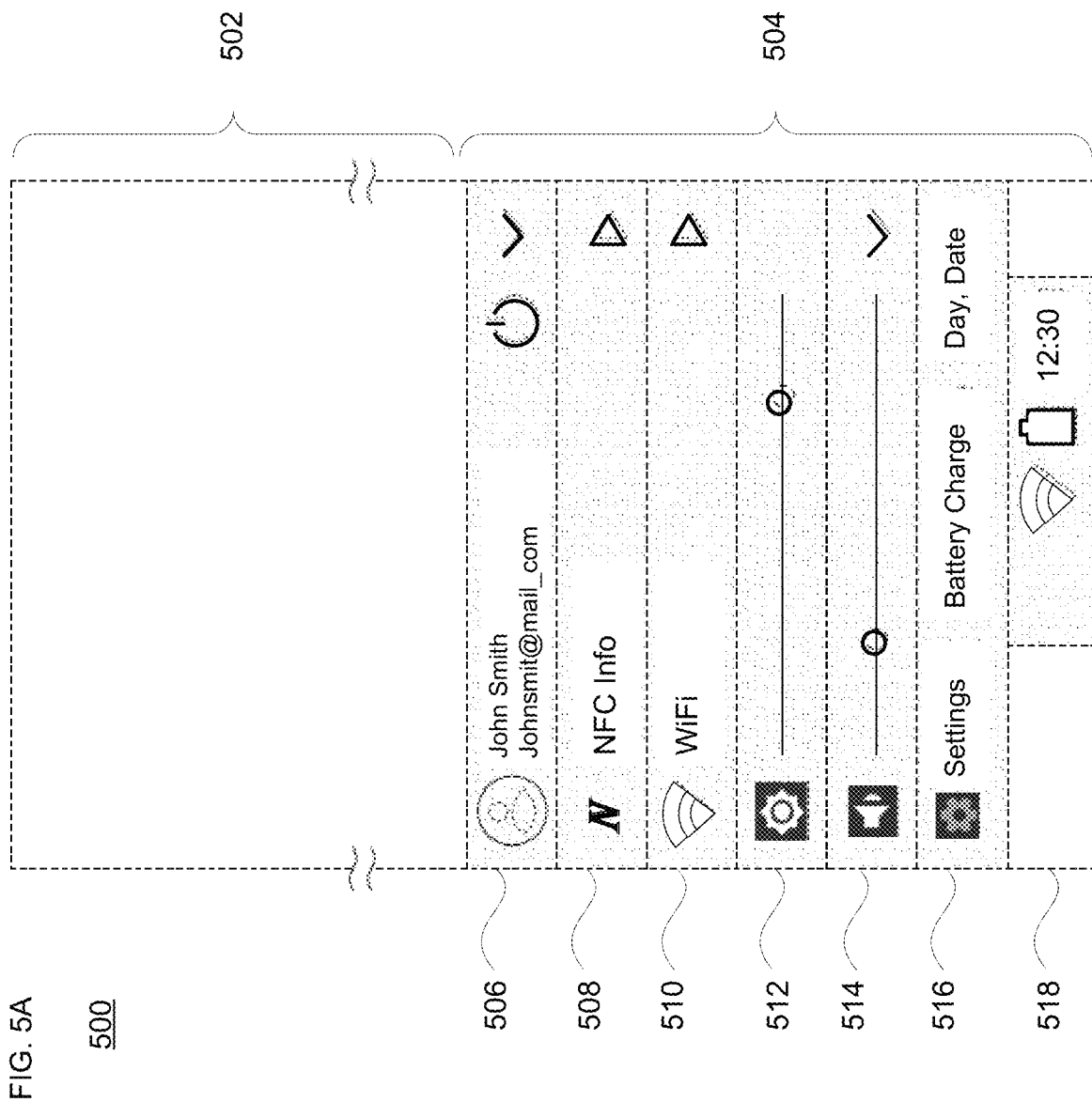

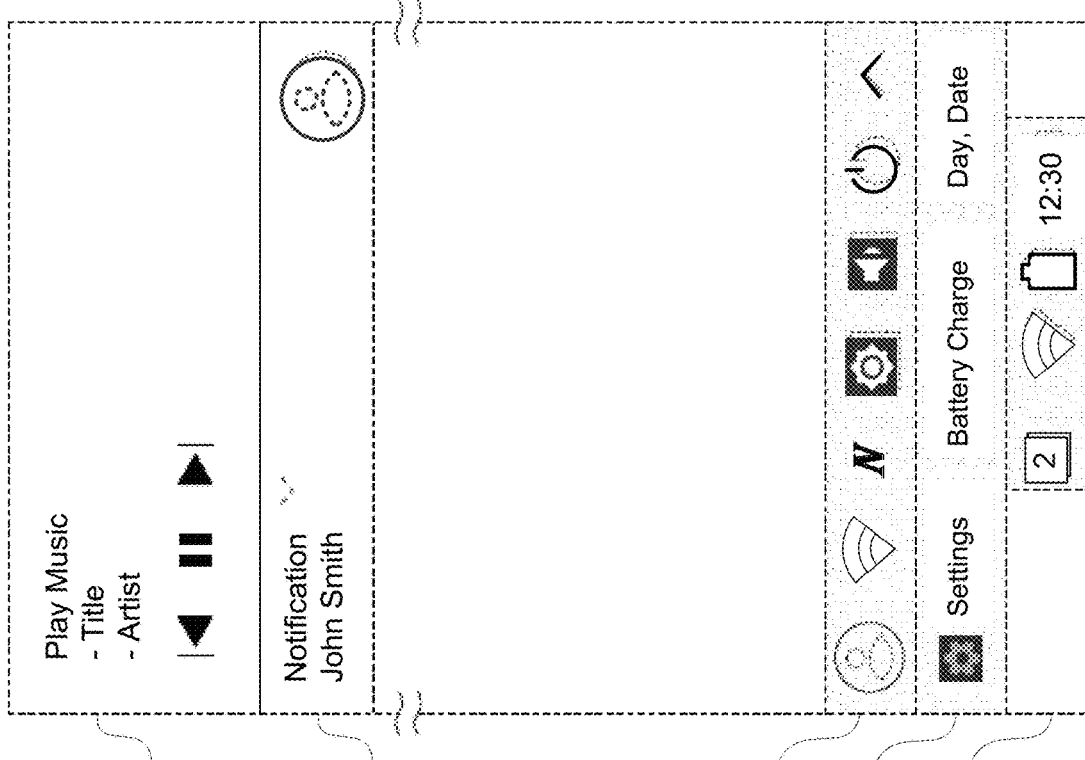
FIG. 5B
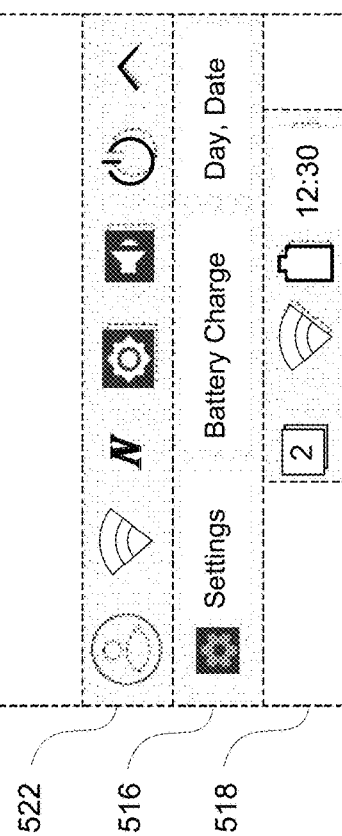
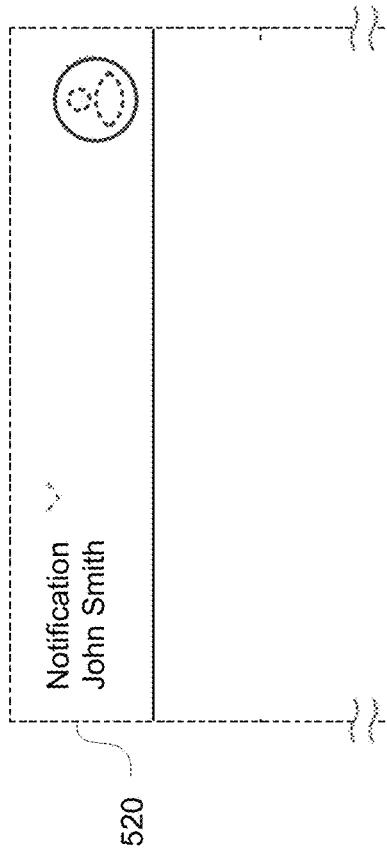
FIG. 5C
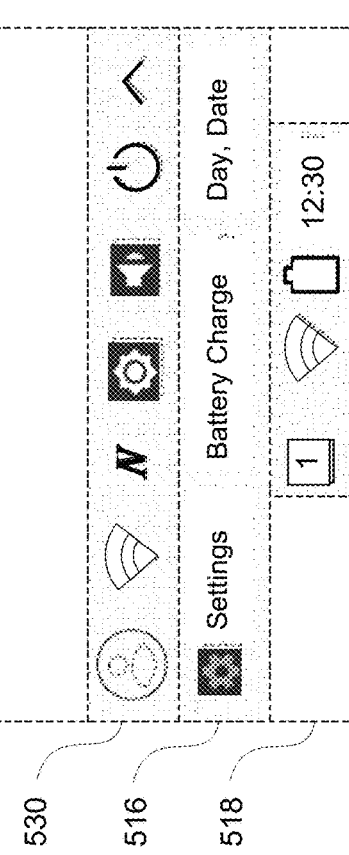

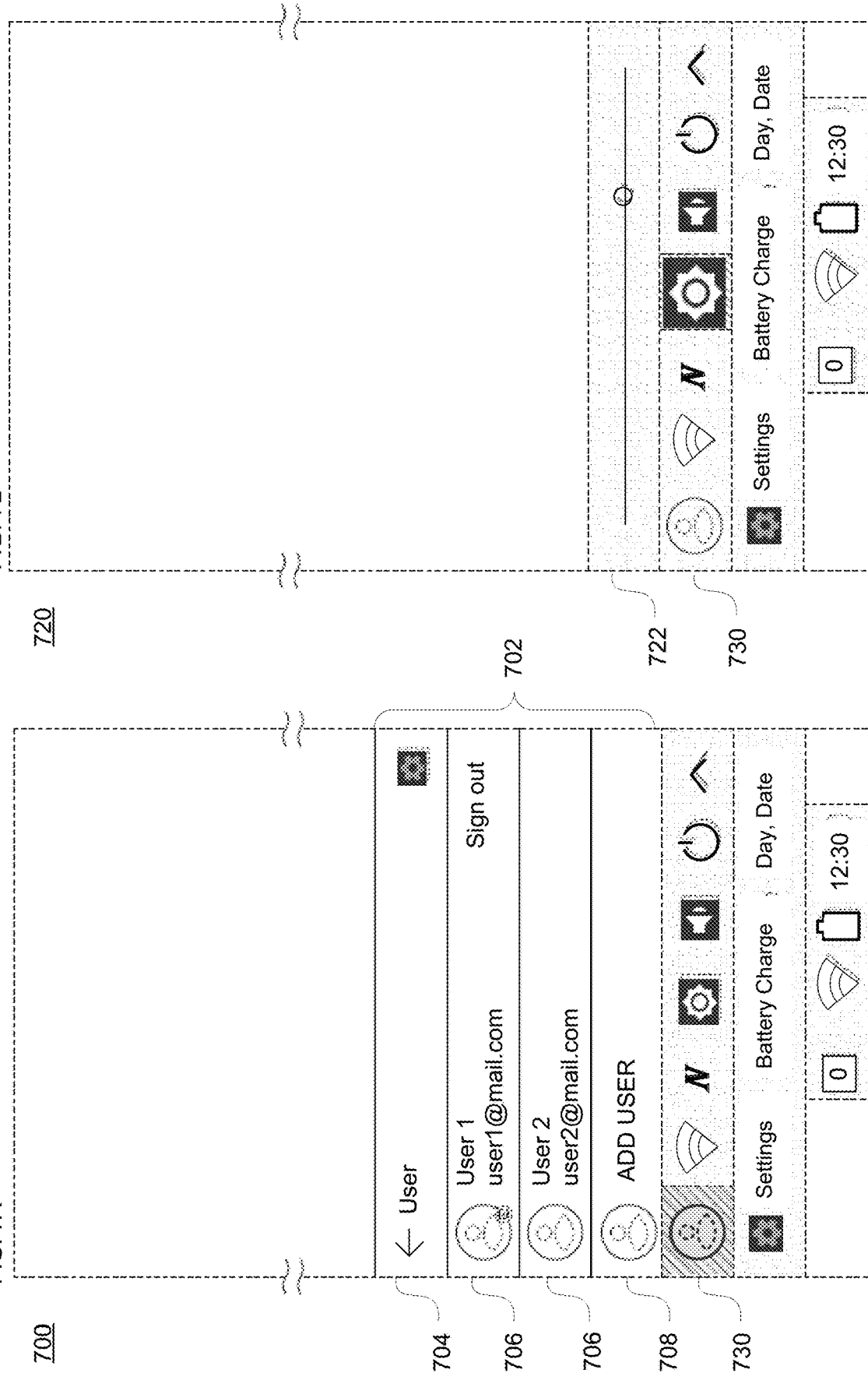

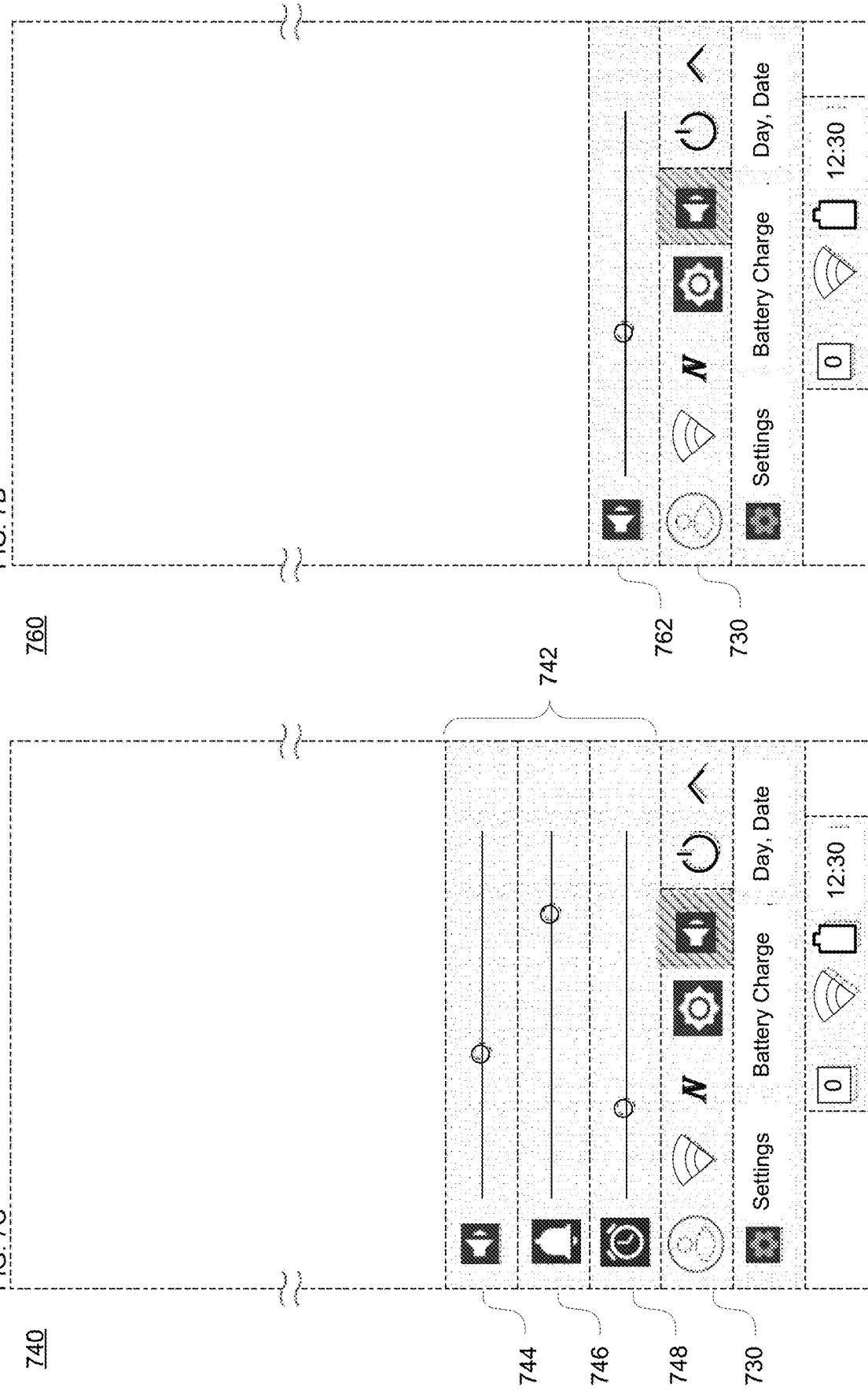

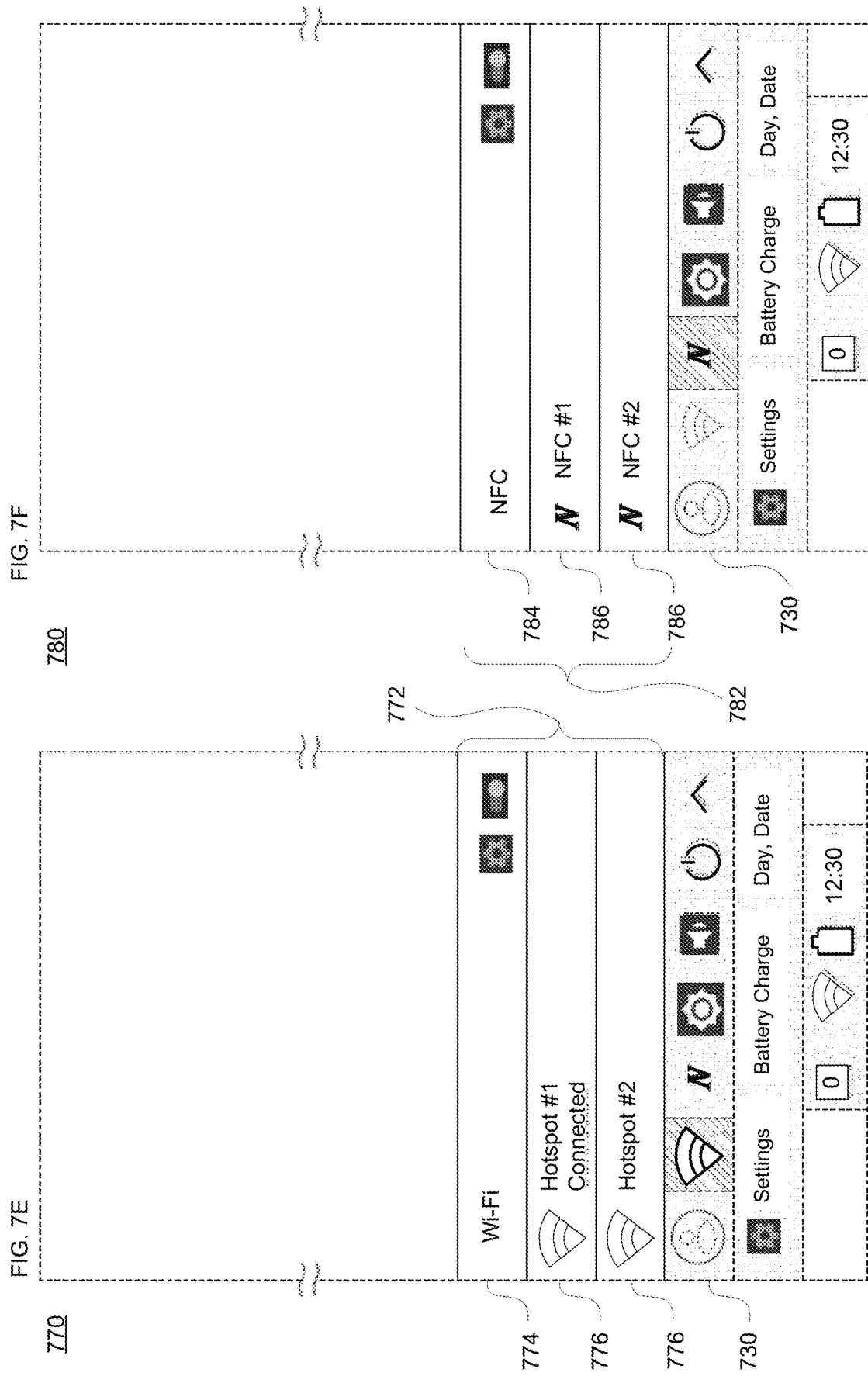

920

1010

1000

UNIFIED AND SMART NOTIFICATIONS AND QUICK SETTINGS SYSTEM

CROSS-REFERENCE TO RELATED APPLICATION

This application is a continuation-in-part of U.S. design application No. 29/580,048, filed Oct. 5, 2016, the entire disclosure of which is incorporated by reference herein.

BACKGROUND

Conventional laptops, tablets, and similar personal electronic devices incorporate a user interface (UI) that presents information to the user in a particular manner. For instance, tabs, drop-down menus, icons and other elements may be presented in a certain location or with a specific appearance for a given application. However, in some instances always providing the same information in the same way may be inefficient depending on a user's preferences or their current activities.

BRIEF SUMMARY

Aspects of the disclosure provide a UI platform that combines user notifications and various operational settings in a single display region, such as a sidebar, to make it convenient for a user to quickly see the information and to manage it. The setting-related information, including system icons for user logins, network info, etc., may be located along the bottom portion of the sidebar, while application-related notifications such as sticky notification icons, hangout icons, etc., are located along another, upper portion of the sidebar. This type of operation is helpful for the user and can improve performance of the device because it provides efficient access to active applications and programs, streamlining management of the system. This can save time and application resources.

In accordance with aspects of the disclosure, a method for presenting setting and notification information in a user device is provided. The method includes identifying, by one or more processors of the user device, a display configuration for a display apparatus of the user device and selecting, by the one or more processors, a sidebar element to present as part of a user interface. The user interface is arranged for presentation on the display apparatus. The method also includes arranging, by the one or more processors, a group of settings for presentation along a first side of the user interface, where the group of settings is arranged in either a summary mode or a detailed mode, as well as identifying a new notification, the new notification corresponding to an active application of the user device. Upon identification of the new notification, the one or more processors generate a graphical element representing the new notification, and arrange the graphical element along a second side of the user interface opposite the first side. The method further includes configuring the user interface with the sidebar element for display on the display apparatus.

In one example, the first side is a bottom side of the user interface and the second side is a top side of the user interface relative to a current orientation of the user device. In another example, the summary mode displays a subset of features from selected settings in the group of settings. In a further example, the detailed mode displays a set of adjustable features for one or more of the settings in the group of settings.

In one alternative, the method further comprises determining whether a set of notifications presented along the second side of the sidebar exceeds a threshold amount, and, in response to determining that the set of notifications exceeds the threshold amount, collapsing the set notifications to hide or minimize at least one notification of the set according to one or more predetermined criteria. In another alternative, the method further comprises determining whether a set of notifications presented along the second side of the sidebar exceeds a threshold amount, and, in response to determining that the set of notifications exceeds the threshold amount, collapsing the group of settings from the detailed mode into the summary mode. In a further alternative, the method also includes applying a do not disturb mode to one or more notifications of a set of displayed notifications.

In one example, identifying the display configuration includes detecting an orientation of the display apparatus and, upon detecting a change in the orientation, determining whether to change a length of the sidebar element. Here, when it is determined to change the length of the sidebar element, the method may further include varying a display mode of at least one notification or at least one setting in the group of settings.

In accordance with aspects of the disclosure, a user device is provided with includes a display module, a user interface module and one or more processors operatively coupled to the display module and the user interface module. The display interface is configured to drive a display apparatus of the user device to present graphical and other information to a user. The user interface module is configured to receive information from one or more user input elements of the user device, and to generate a user interface for presentation to the user. And the one or more processors are configured to identify a display configuration for the display apparatus, select a sidebar element to present as part of the user interface and arrange a group of settings for presentation along a first side of the user interface. The group of settings may be arranged in either a summary mode or a detailed mode. The processors are also configured to identify a new notification corresponding to an active application of the user device. Upon identification of the new notification, the processors are configured to generate a graphical element representing the new notification and arrange the graphical element along a second side of the user interface opposite the first side. The processors also configure the user interface with the sidebar element for display on the display apparatus.

In one example, the first side is a bottom side of the user interface and the second side is a top side of the user interface relative to a current orientation of the user device. In another example, the user device further includes one or more position and orientation sensors operatively coupled to the display apparatus and configured to generate position and orientation information including rotation data. Here, upon determination that the rotation data indicates rotation of the display apparatus from a first position to a second position, the one or more processors and the user interface module are configured to expand or shrink the sidebar element in at least one of a vertical direction or a horizontal direction. In this case, expansion or shrinking of the sidebar element includes changing how at least one of notifications and settings are presented in the user interface.

In another example, the summary mode displays a subset of features from selected settings in the group of settings and the detailed mode displays a set of adjustable features for one or more of the settings in the group of settings. In a further example, the one or more processors are further configured to determine whether a set of notifications presented along the second side of the sidebar exceeds a threshold amount, and, in response to the determination that the set of notifications exceeds the threshold amount, either collapse the set notifications to hide or minimize at least one notification of the set according to one or more predetermined criteria or collapse the group of settings from the detailed mode into the summary mode.

In one alternative, the one or more processors are further configured to apply a do not disturb mode to one or more notifications of a set of displayed notifications. In another alternative, the one or more processors are further configured to detect an orientation of the display apparatus and upon detection of a change in the orientation, determine whether to change a length of the sidebar element. Here, when it is determined to change the length of the sidebar element, the processors are configured to vary a display mode of at least one notification or at least one setting in the group of settings.

In accordance with aspects of the disclosure, a non-transitory computer-readable recording medium is provided that has instructions stored on it. The instructions, when executed by one or more processors, cause the processors to perform a method for presenting setting and notification information in a user device. The method includes identifying a display configuration for a display apparatus of the user device and selecting a sidebar element to present as part of a user interface. The user interface is arranged for presentation on the display apparatus. The method also includes arranging a group of settings for presentation along a first side of the user interface, in which the group of settings is arranged in either a summary mode or a detailed mode. The method further includes identifying a new notification corresponding to an active application of the user device. Upon identification of the new notification, the process includes generating a graphical element representing the new notification, and arranging the graphical element along a second side of the user interface opposite the first side. The method also includes configuring the user interface with the sidebar element for display on the display apparatus.

In one example here, the method further includes determining whether a set of notifications presented along the second side of the sidebar exceeds a threshold amount. In response to determining that the set of notifications exceeds the threshold amount, the process includes either collapsing the set notifications to hide or minimize at least one notification of the set according to one or more predetermined criteria, or collapsing the group of settings from the detailed mode into the summary mode.

And in another example, identifying the display configuration includes detecting an orientation of the display apparatus. Upon detecting a change in the orientation, the method includes determining whether to change a length of the sidebar element, and varying a display mode of at least one notification or at least one setting in the group of settings.

BRIEF DESCRIPTION OF THE DRAWINGS

FIG. 3 illustrates an example network with different user devices according to aspects of the disclosure.

FIGS. 4A-C illustrate a first use case in accordance with aspects of the technology.

FIGS. 5A-C illustrate a second use case in accordance with aspects of the technology.

FIGS. 7A-F illustrate various UI arrangements in accordance with aspects of the technology.

DETAILED DESCRIPTION

Overview

The technology relates to content presentation, such as user notifications and application setting, on a display of a user device, such as a laptop, tablet, netbook, mobile phone, PDA or other type of user device. A shared region of the display, such as a sidebar, is configured to provide a dynamic arrangement of various notifications and settings that can relate to current applications and activities. The user notifications are arranged along one portion of the UI while the settings are arranged along another portion of the UI. In one scenario, while the notification and setting portions do not overlap, their relative size and appearance may change depending on what applications are currently active and what information is being presented to the user.

As discussed in detail below, this arrangement is flexible to accommodate content based on different priority levels. In one arrangement, the freshest or most recent notifications may be provided along a top section of the sidebar. There may be a lot of notifications for various applications including mail, hangouts, social media and calendar applications, to name a few. The notifications may be in the form of persistent or sticky notes that exist while a particular application is running, such as a music application. In this case, once the application is closed, the notification may be removed from the list.

The system is able to auto collapse (or expand) the list when a new notification is received. The collapsing may be an accordion-type effect, indicating to the user that a change has been made to the list. Also, a "do not disturb" mode can be applied to some or all of the notifications, for instance so that audible, visual and/or vibrating feedback is suppressed. This mode may include "total silence" and "priority" options, allowing the user to further customize presentation of the content on the UI.

The quick settings, for instance along a bottom region of a sidebar, may be provided in a condensed or collapsed summary arrangement or in a more detailed advanced mode where particular settings are expanded. According to one aspect of the technology, a given setting may still be accessible by the user while in the collapsed state. In the summary-type mode, the settings portion of the UI shrinks/collapses to a core group of settings visible and accessible to the user. For instance, the core settings may be presented as a single row of icons that allow the user to access an account login, Wifi and Bluetooth™ settings, as well as audio, power, display and/or other setting options. As with the notifications, the settings may auto collapse (or expand) depending on current activity, such as upon receipt of a new notification.

These features can be implemented in a variety of use cases. Such use cases and other operational aspects are discussed in detail below. Before that, some example system configurations are presented.

Example Systems

Figure 1A:
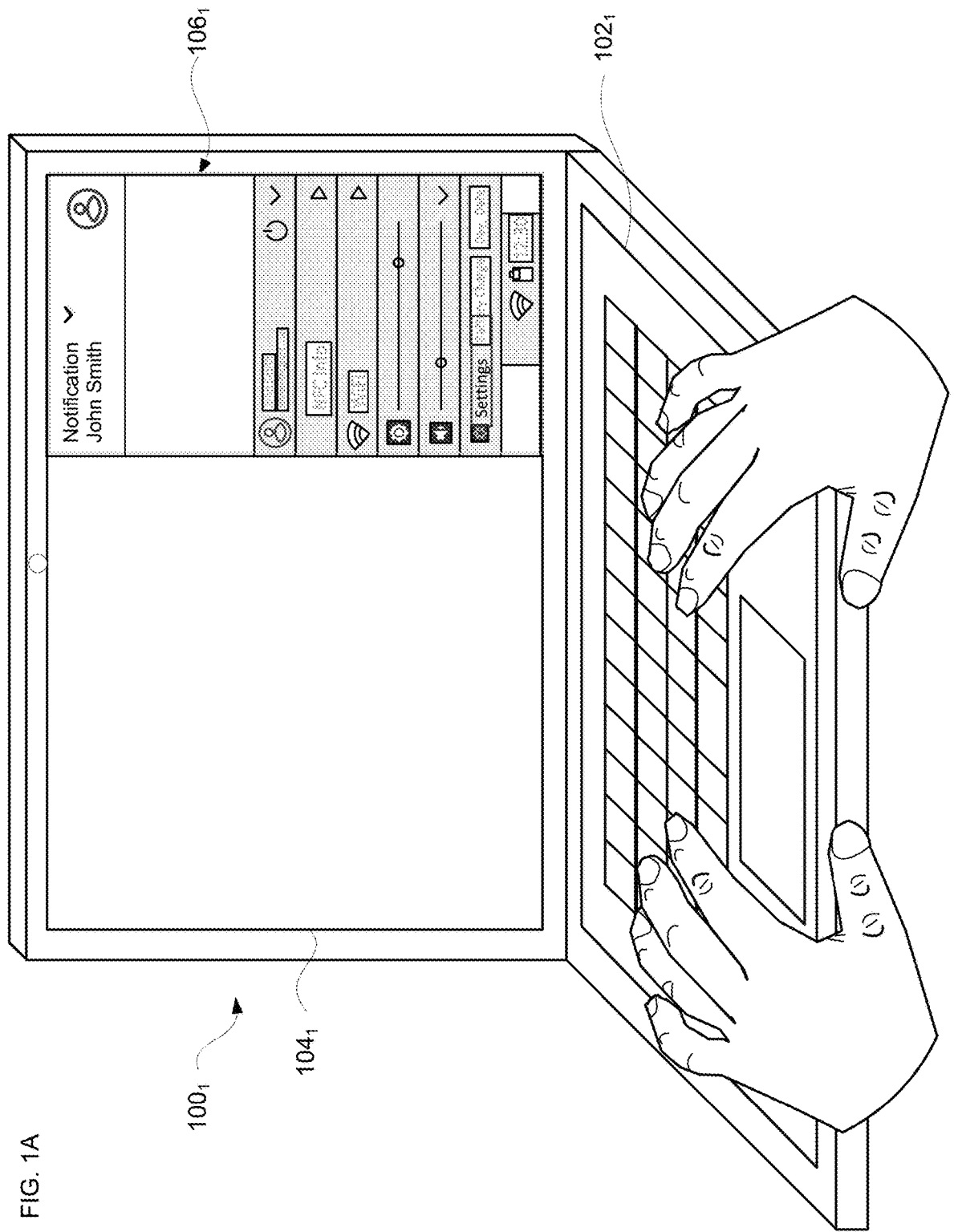
FIGS. 1A-B illustrate example user devices with user interfaces according to aspects of the disclosure.
Figure 1B:
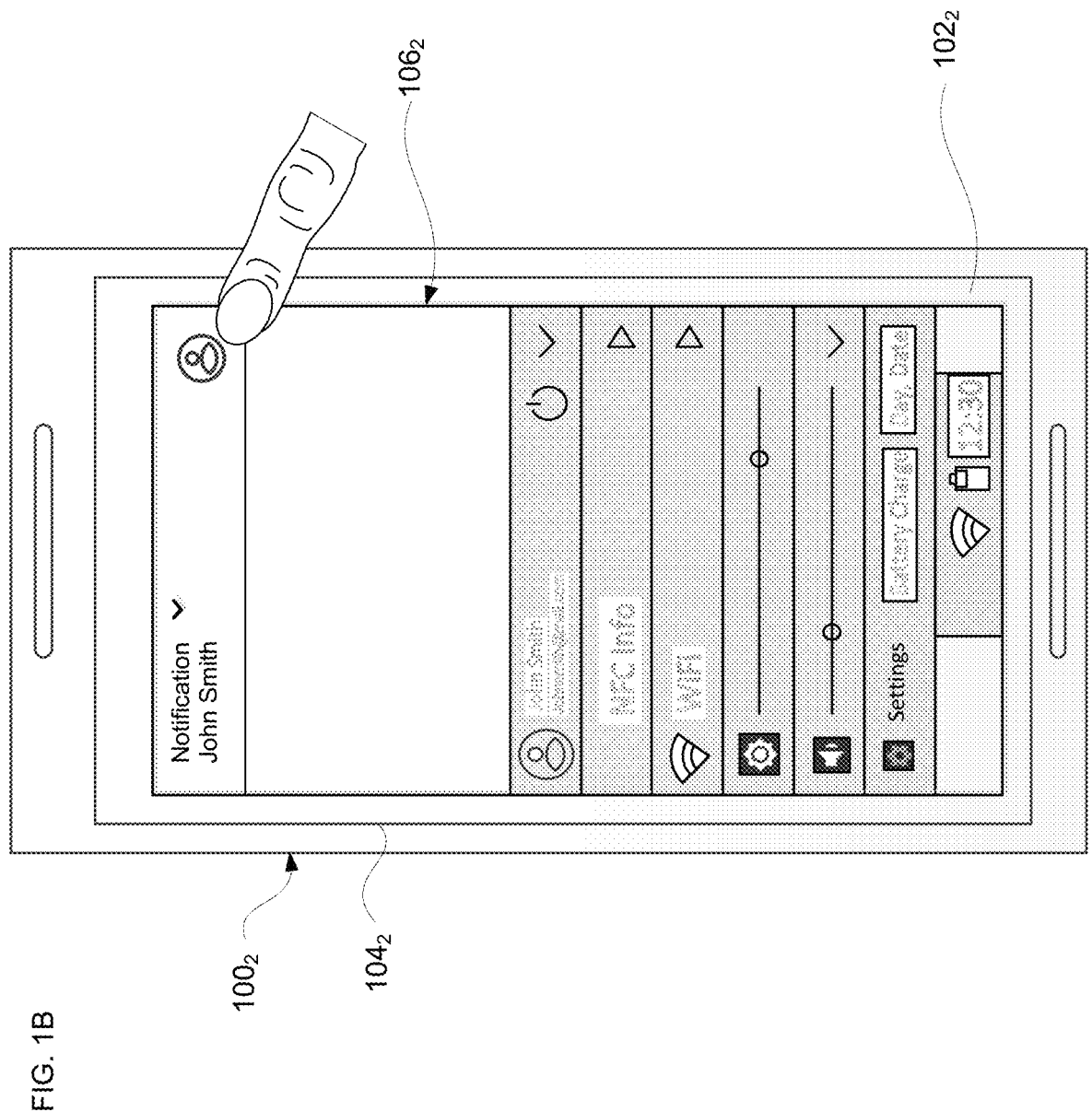

FIG. 1A illustrates an example laptop-style user device $100_1$ and FIG. 1B illustrates an example PDA or smart phone type user device $100_2$ that can incorporate the user interface technology described herein. As shown in FIG. 1A, the user device $100_1$ includes a user input section $102_1$ and a display section $104_1$. In this device, the user input and display sections may be moveable relative to and/or separable from one another. In contrast, as shown in FIG. 1B the user input section $102_2$ and the display section $104_2$ may be part of a single housing element.

In either configuration, user interface $106_1$ or $106_2$ is generated for presentation on a display screen. By way of example, the display screen may be a TFT LCD (Thin-Film-Transistor Liquid Crystal Display) or OLED (Organic Light Emitting Diode) display. The user interface $106_1$ may be positioned along a right side (e.g., a "right rail") of the display screen, while the user interface $106_2$ may be arranged to encompass all or substantially all of the display screen. With either type of device, other locations and configurations for the user interface are possible. For instance, the user interface $106_1$ may be positioned along a lift side ("left rail") of the display screen, or extending lengthwise across an upper or lower region of the display screen.

Figure 2:
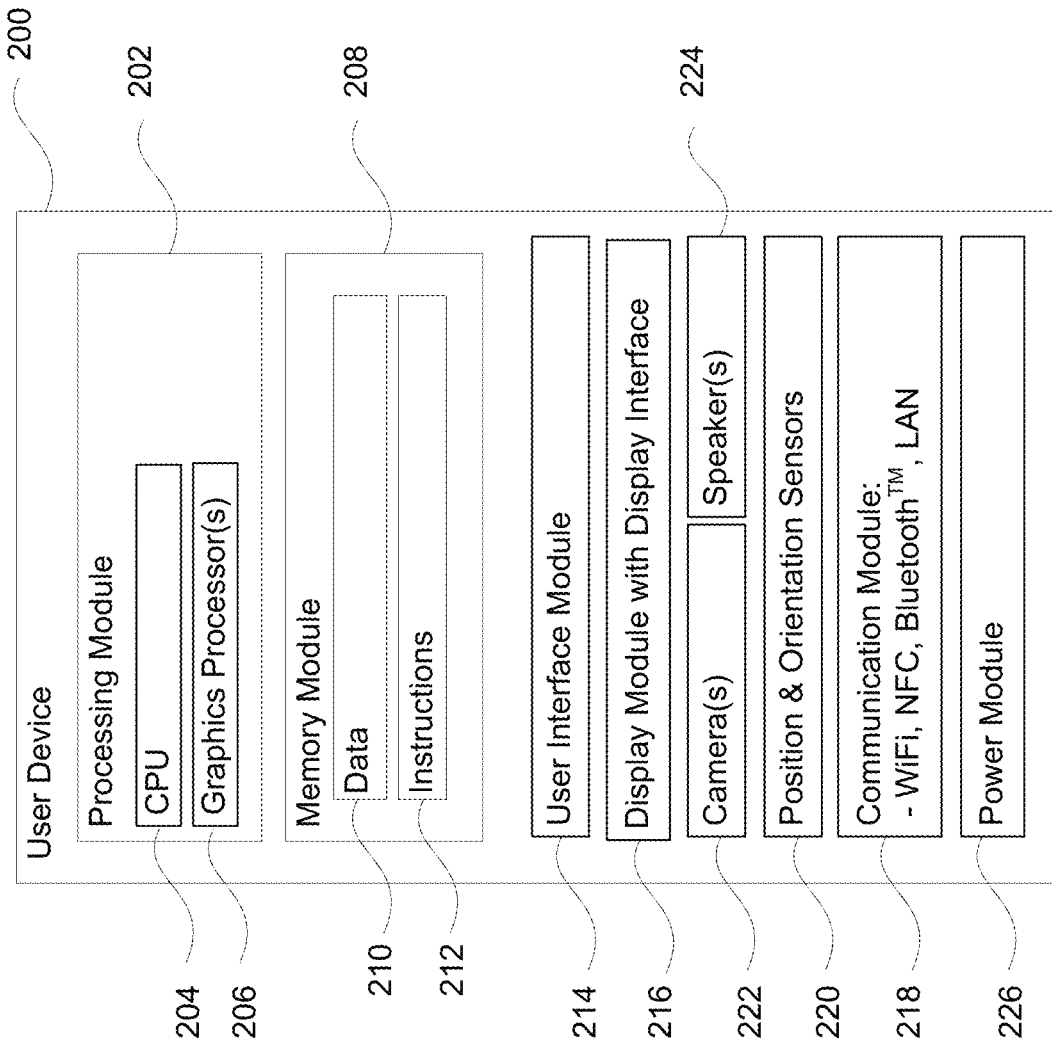
FIG. 2 is an example block diagram of a user device according to aspects of the disclosure.

The block diagram 200 of FIG. 2 illustrates components common to the user devices of FIGS. 1A and 1B. For instance, processing module 202 includes a CPU 204 and one or more graphics processors 206, and memory module 208 is configured to store data 210 and instructions 212.

The CPU and other processors of the processing module 202 may or may not operate in parallel, and may include ASICs, controllers and other types of hardware circuitry. By way of example, the graphical information may be generated by the graphics processors 206, while CPU 204 manages overall operation of the user device 100. The system is configured to receive information from a user through user inputs of user interface module 214 and to present information to the user via display module 216 including a display interface. User interface module 214 may receive commands and other information from a user via the user inputs and convert them for submission to a given processor(s). The user interface module 214, in conjunction with the processors of the processing module, is also configured to generate user interface 106 and to provide the necessary information to the display module 216. The display interface of the display interface 216 may comprise appropriate circuitry for driving the corresponding display device to present graphical and other information to the user.

Memory module 208 can be implemented as one or more of a computer-readable medium or media, a volatile memory unit or units, or a non-volatile memory unit or units. The memory module 208 may include, for example, flash memory and/or NVRAM, and may be embodied as a hard-drive or memory card. Alternatively the memory module 208 may also include DVD, CD-ROM, write-capable, and read-only memories. In one implementation, a computer program product is tangibly embodied in an information carrier. The computer program product contains instructions, such as the instructions 212 that, when executed by one or more processors, perform one or more methods or operations such as those described herein. Although FIG. 2 functionally illustrates the processor(s), memory module, and other elements of the user device as being within the same overall block, such components may or may not be stored within the same physical housing.

The data 210 may be retrieved, stored or modified by the processors in accordance with the instructions 212. The data may also be formatted in any computing device-readable format. The instructions 212 may be any set of instructions to be executed directly (such as machine code) or indirectly (such as scripts) by the processor(s). For example, the instructions may be stored as computing device code. In that regard, the terms "instructions" and "programs" may be used interchangeably herein. The instructions may be stored in object code format for direct processing by the processor(s), or in any other computing device language including scripts or collections of independent source code modules that are interpreted on demand or compiled in advance. Functions, methods and routines of the instructions in accordance with the dynamic user interface are explained in more detail below.

The user inputs of the user interface module 214 may include a touch screen element such as a capacitive or resistive touch screen, as well as physical input buttons, keys, switches, dials, slides, a microphone, a mouse, a pen input, trackball, etc. In addition to visual feedback via the display devices, the system may audio and/or sensory (e.g., tactile) feedback.

As also shown in FIG. 2, the user device also includes a communication module 218 for communicating with other devices and systems. The communication module 218 may include one or both of a wireless transceiver and a wired transceiver (not shown), which may provide a network connection. The user device may communicate with other remote devices, which is seen in illustration 300 of FIG. 3. By way of example, various user devices $300_1$, $300_2$, $300_3$, and $300_4$ may be connected to one or more servers 320 via network 310. The client devices 300 may obtain content such as music, images, videos, messages from a network database such as cloud database 340, which is coupled to one or more servers via a bus or other arrangement 330.

Returning to FIG. 2, the communication module 218 may communicate with other devices and networks using various configurations and protocols, including short range communication protocols such as near-field communication (NFC), WiFi, Bluetooth, Bluetooth LE. The networks may be any kind of network including the Internet, intranets, virtual private networks, wide area networks (WANs), local area networks (LANs), private networks, and various combinations of the foregoing.

In addition, the user device as shown includes one or more position and orientation sensors 220. The position and orientation sensors 220 are configured to determine the position and orientation of user device 100. For example, these components may include a GPS receiver to determine the device's latitude, longitude and/or altitude as well as an accelerometer, gyroscope or another direction/speed detection device. The client device 100 also includes one or more camera(s) 222 for capturing still images and recording video streams, speaker(s) 224 and a power module 226.

Position and orientation information from the sensors 220 may be used to adjust the size, position and/or appearance of a displayed UI. For instance, if the display device is rotated from a landscape position to a portrait position, the displayed UI may expand (or shrink) in the vertical direction. In turn, this may change how notifications and/or settings information is presented to the user.

Example Methods and Use Cases

As noted above, features of the technology can be implemented in a variety of use cases. Examples of such user cases and other scenarios are discussed below and with reference to the accompanying figures.

Figure 4A:
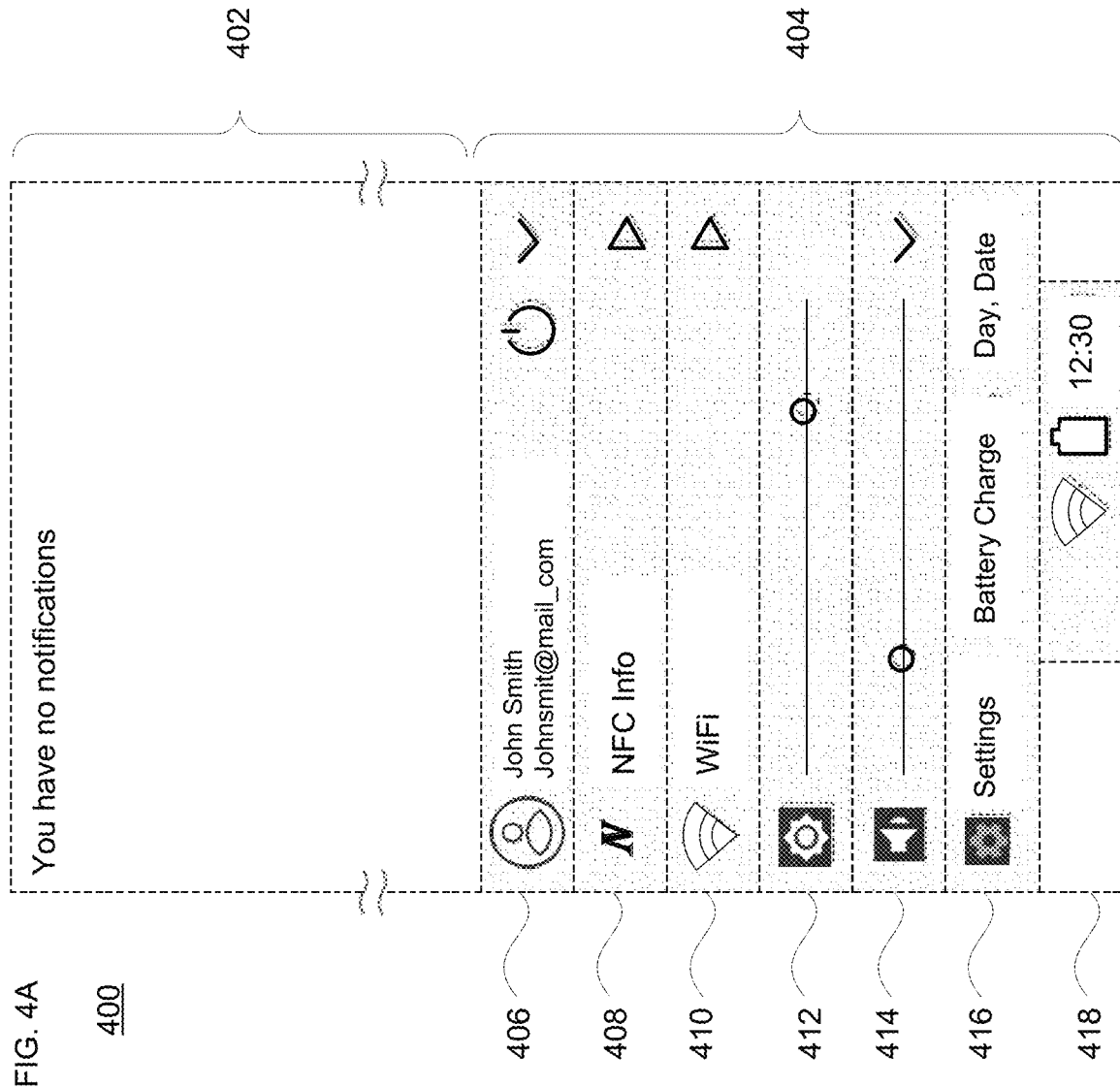

A first use case is presented in FIGS. 4A-C, which shows how the introduction of user notifications can change how settings and other information is presented to the user. Turning first to FIG. 4A, this figure illustrates a shared region 400 of the display (for instance a sidebar), which includes a user notifications area 402 and an application settings area 404. The user notifications area 402, as indicated by the wavy double lines, may have a variable length. This length may depend on the number of notifications being presented, the size of the notification, the appearance of the notifications, the available size of the display screen, or any combination of these factors. When there are no notifications, the user notifications area 402 may be set to a default size relative to the shared region 400. By way of example, the default size of the user notification area 402 may be equivalent to or otherwise no greater than the size of application settings area 404. As shown in FIG. 4A, the user notifications area 402 may visually indicate to the user that there are no notifications, for instance by stating "You have no notifications", by an icon, shading of the area or the like.

The application settings area 404 may also be of variable size as shown in subsequent figures. In FIG. 4A, the application settings area 404 is visually broken out into or otherwise delineated in a number of rows for different settings and features. By way of example, the application settings area 404 includes a user account setting 406, a near field communication setting 408, a WiFi communication setting 410, a display setting 412, a sound setting 414, a general setting and information section 416, and a quick information section 418. More or fewer features and settings may also be provided in the application settings area 404. Each of the settings and features may be selected, modified or otherwise acted upon by the user, as discussed in further detail below. Furthermore, while the settings and features are shown arranged in a particular order, this order may be changed based on various criteria, including how recently a setting was accessed, a setting priority, user preferences, etc.

In this example use case, upon the occurrence of an action or event that satisfies some criterion, the processing system creates a notification in response to the criterion, which is presented in the user notifications area 402. This is shown in FIG. 4B, where notification 420 is provided along an upper section of the user notifications area 402. Similarly, as shown in FIG. 4C, when another action or event triggers creation of a notification, that new notification 422 is added to the user notifications area 402.

The various notifications may be arranged along the display area according to how new (or old) each notification is, the priority of each notification, the type of application or program associated with the notifications, and combinations of these and other criteria. For instance, the freshest or most recent notification may be provided at the top of the sidebar or other display area. The type of application may include emails, audio or video calls, texting apps, social media platforms, calendars, music players, video players, etc. Each type of application or individual application may be assigned a priority or other ranking that is used to identify the relative placement of a notification associated with that respective application. In the example of FIG. 4C, the notification 420 may be for an email account, while the notification 422 may be for a video call. In this example, the notification 422 for the video call may be placed at the top of the notifications list because it is fresher or because the video call has a higher priority than an email notification.

In this use case, when the notification 420 first occurs, as shown in FIG. 4B the application settings area 404 may be minimized to only show the quick information section 418, which may include basic information about WiFi or cellular signal strength, battery life and the current time. Here, the quick information section 418 may also identify the number of notifications, as shown by the "1" indicator in FIG. 4B, and the "2" indicator in FIG. 4C.

A second use case is shown in FIGS. 5A-C, which illustrates how the introduction of a notification consolidates the application settings area into core settings information. Turning first to FIG. 5A, similar to FIG. 4A this figure illustrates a shared region 500 of the display (for instance a right or left rail sidebar), which includes user notifications area 502 and application settings area 504. For ease of readability, reference numerals similar to those in the first use case are used here. Thus, the application settings area 504 includes a user account setting 506, a near field communication setting 508, a WiFi communication setting 510, a display setting 512, a sound setting 514, a general setting and information section 516, and a quick information section 518.

And as can be seen, in FIG. 5B, when a new notification 520 is displayed, the application settings area 504 is partially collapsed into a set of consolidated core settings 530. The core settings 530 may only include icons for certain settings, such as user account, WiFi, NFC, display, sound and power settings. As noted above, the arrangement of the settings may vary depending on various criteria. And as shown in FIG. 5C, when another action or event triggers creation of a notification, new notification 522 is added to the user notifications area 502. As shown in this example, the new notification 522 may be for an audio program such as a music player.

Figure 6B:
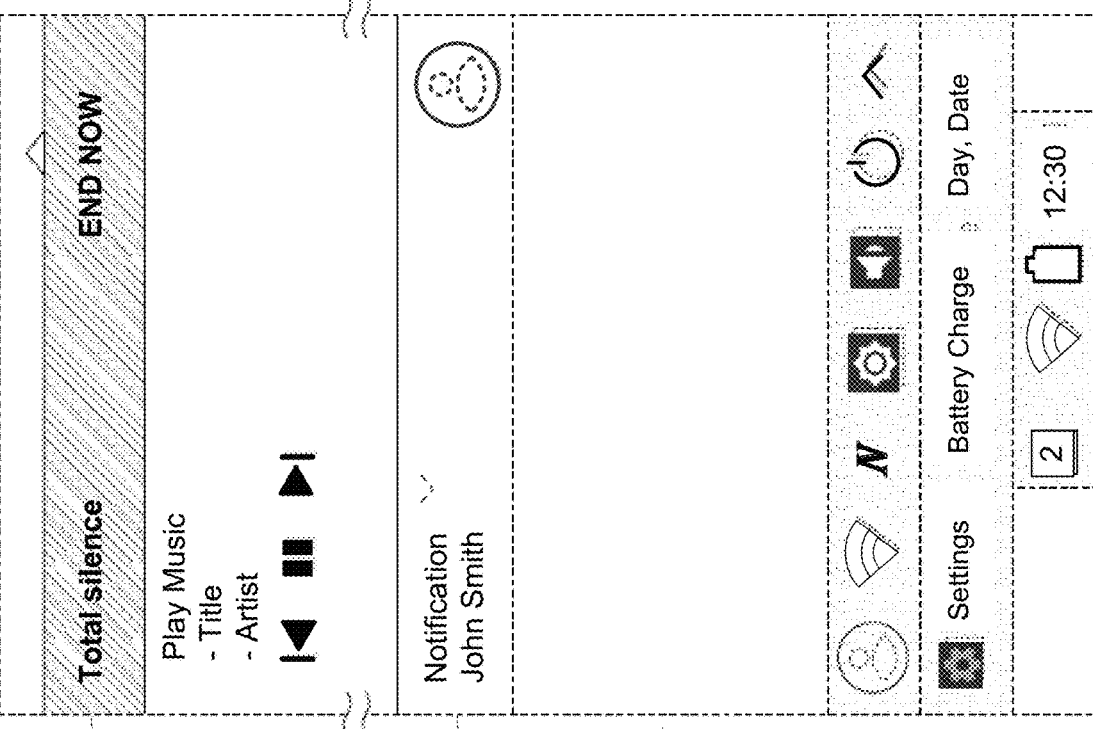
FIGS. 6A-B illustrate a third use case in accordance with aspects of the technology.
Figure 6A:
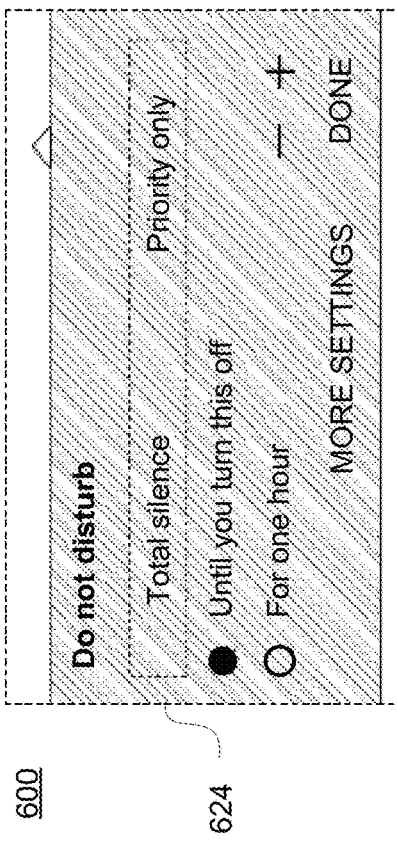

A third use case is shown in FIGS. 6A-B, which involves "do not disturb" operation. Turning first to FIG. 6A, shared region 600 of the display includes multiple notifications 620, 622 and 624, as well as various account settings 616, 618 and 630 similar to those described above in the earlier use cases. In this case, the UI provides a do not disturb mode as seen by notification 624. The do not disturb mode can prevent certain reminders or other information being presented to the user via, e.g., audible, visual and/or vibratory alerts. In this portion of the user notifications area, the do not disturb mode gives the user various options to not receive reminders or indications about some or all of the notifications. As shown, the user may select for this feature to be active until the user turns it off or for a selected period of time. The selected period of time may be changes by the "−" and "+" buttons.

In addition, the user may select between different quiet levels. For instance, the user may select either a "total silence mode" or a "priority only" mode. In the total silence mode 626 (see FIG. 6B), while the notifications may be presented visually on the display, none of the notifications provides any audible sounds or other alerts to the user. In the priority only mode, only selected notifications are quieted. And as seen in the difference between the general do not disturb mode notification 624 and the total silence mode 626, the size and appearance of these notifications may differ, and as a result, the relative size of the user notifications area may change as well. This may result in other notifications—such as older or lower priority notifications—being presented lower in the user notifications area. Alternatively, there may be a gap region 628 between the user notification area and the application settings area. This gap region 628 may vary in size depending on the number of notifications and/or settings currently presented on the UI.

A number of UI configurations are shown in FIGS. 7A-F. Starting in display region 700 of FIG. 7A, the user account setting 406 from FIG. 4A is seen as expanded into a full user setting panel 702. Here, this panel may include a user settings section 704, in which the user may select or modify certain aspects of the user settings. One or more users are listed in registered user sections 706. This allows for multiple users of the same device to easily log in and out of an application, which may be particularly useful in a classroom or training situation. A new user can be added via the new user section 708. Core settings 730 provides an indication of various settings that the user can quickly select and manage. Here, the user account setting icon is highlighted to show that this is the active setting.

FIG. 7B illustrates display region 720, in which the settings section includes brightness panel 722. The brightness panel 722 allows the user to easily change the brightness of the display device, for instance via a linear slider bar. In this example, the brightness setting icon of core settings 730 is highlighted to show that this is the active setting.

FIG. 7C illustrates display region 740, which includes an audio panel 742. The audio panel 742 includes, for instance, volume section 744, chime section 746, alarm section 748 and core settings 730. In the core settings, the audio icon is highlighted to indicate that the audio panel 742 is the active setting. Similarly, FIG. 7D illustrates display region 760, which includes an abbreviated volume panel 762. The abbreviated volume panel 762 may be used to control the volumes for sounds, chimes, alarms, etc. simultaneously. Or, alternatively, the abbreviated volume panel 762 may only adjust one type of volume.

FIG. 7E illustrates display region 770, in which WiFi communication setting 410 of FIG. 4A is expanded into WiFi panel 772. The WiFi panel 772 includes WiFi settings section 774, in which the user may select or modify certain aspects of the WiFi settings, for instance searching for additional WiFi hot spots or removing a particular hotspot from the active list, or enabling or disabling the WiFi transceiver. One or more WiFi hotspots are listed in hotspot sections 776. The user may choose which hotspot to use by selecting one of the available options. Similar to the above, the WiFi icon in the core settings 730 is highlighted to show that the WiFi panel 772 is active.

FIG. 7F illustrates display region 780, in which near field communication setting 408 of FIG. 4A is expanded into NFC panel 782. The NFC panel 782 includes NFC settings section 784, in which the user may select or modify certain aspects of the NFC settings, for instance enabling or disabling NFC operation. One or more NFC links are listed in sections 786. The user may choose which NFC link to use by selecting one of the available options. Similar to the above, the NFC icon in the core settings 730 is highlighted to show that the NFC panel 782 is active.

Figure 8A:
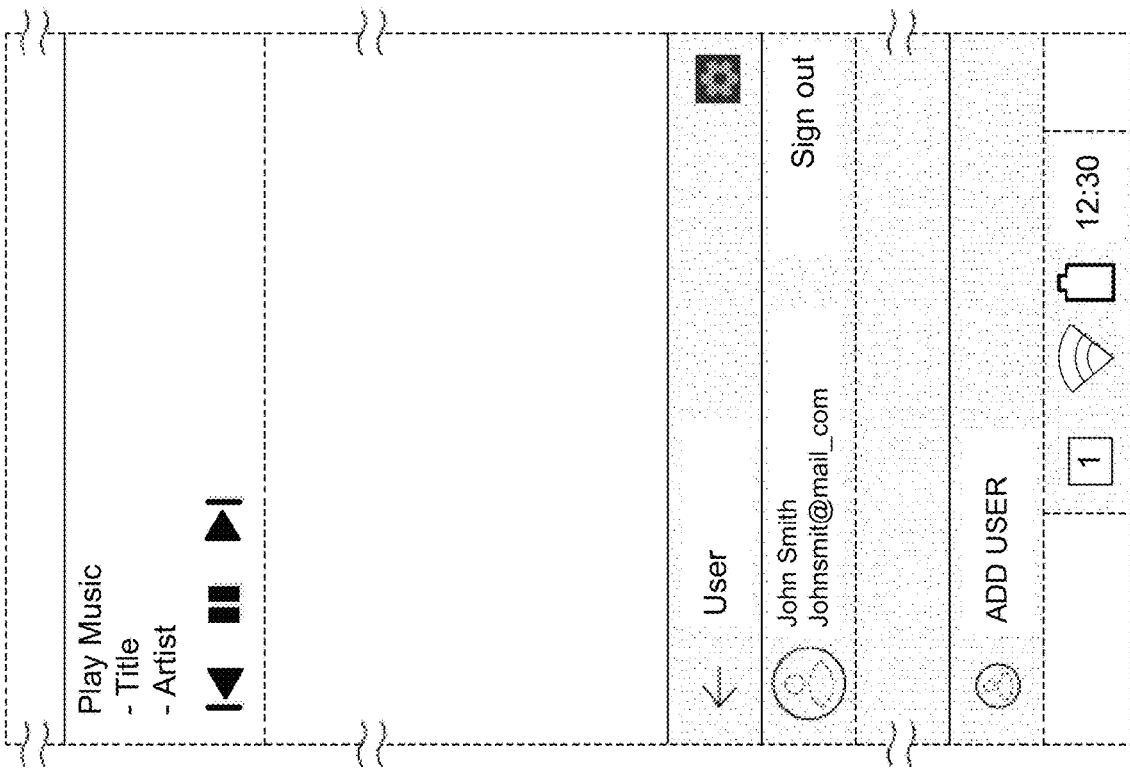
FIGS. 8A-B illustrate another use case in accordance with aspects of the technology.
Figure 8B:
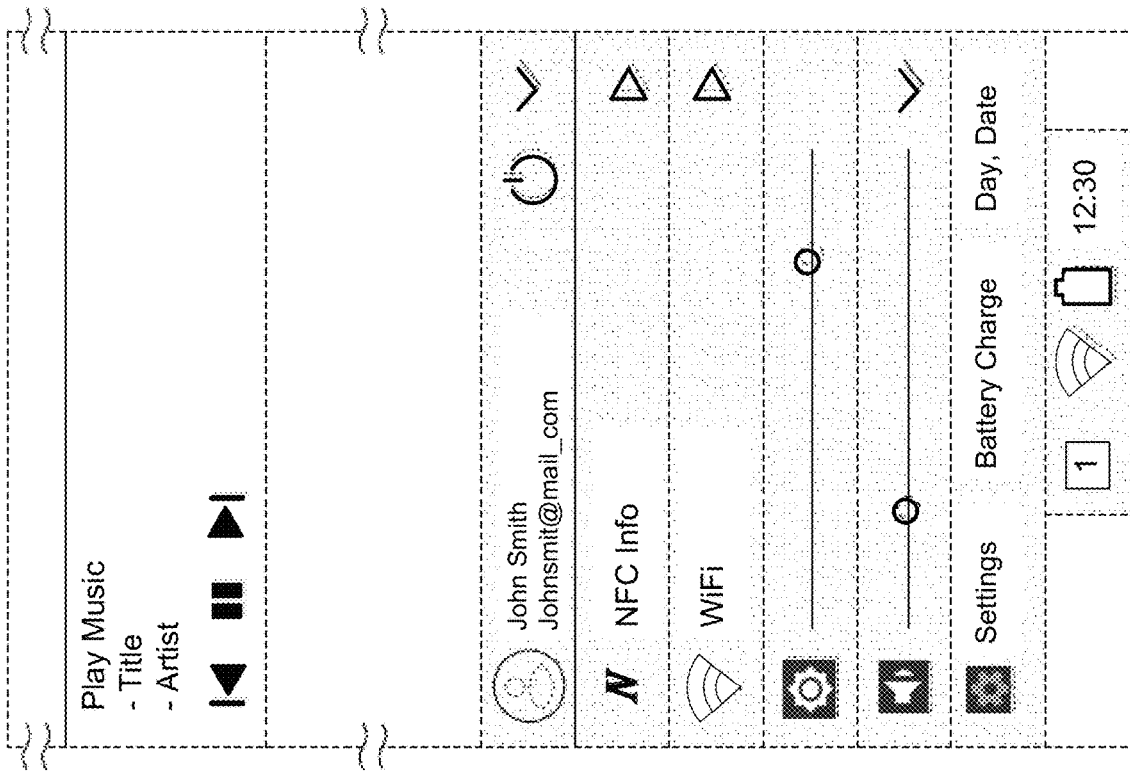

FIGS. 8A-B present another use case, in which the UI transitions between one view 800 (FIG. 8A) with an expanded application settings area and another view 810 (FIG. 8B) with a condensed application settings area focusing on the user settings. The user notifications area may have one or more notifications, such as for a music application. Depending on the number of notifications, as discussed above there may be a gap region separating the notifications from the settings. As indicated by the wavy double lines, in FIGS. 8A and 8B, the UI display region may have a variable length for both the user notifications area and the application settings area.

Figure 9A:
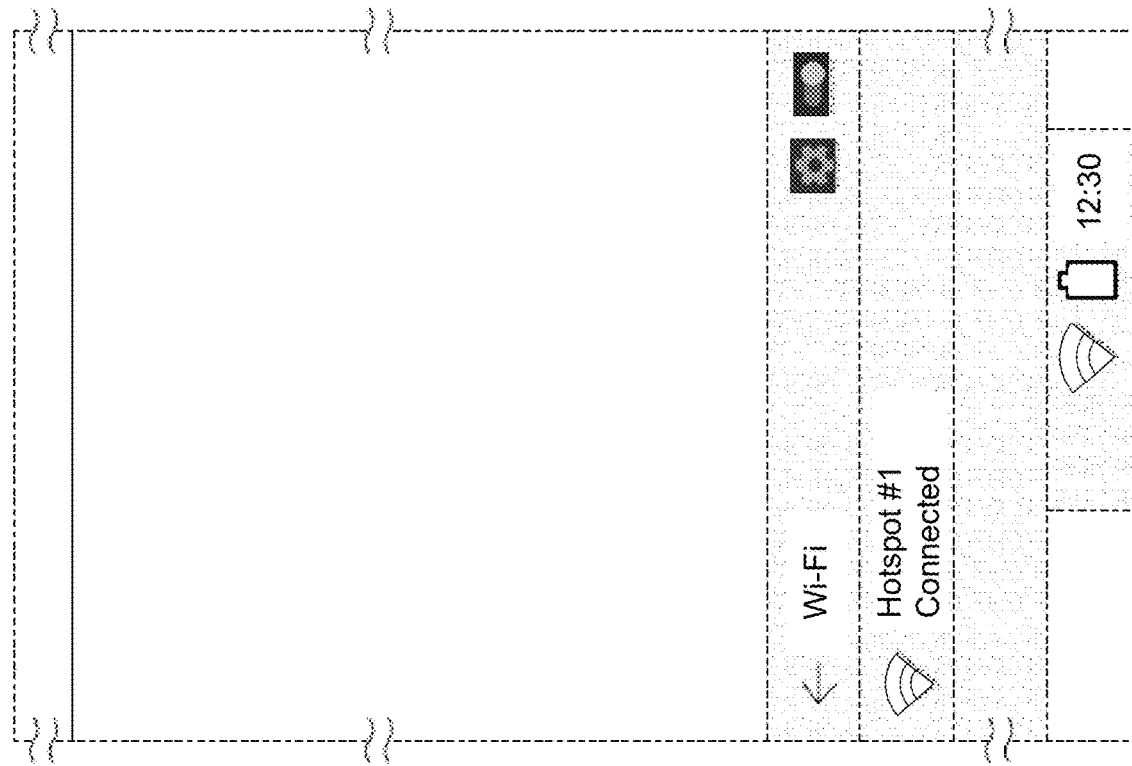
FIGS. 9A-C illustrate various examples of different settings presented in the UI.
Figure 9B:
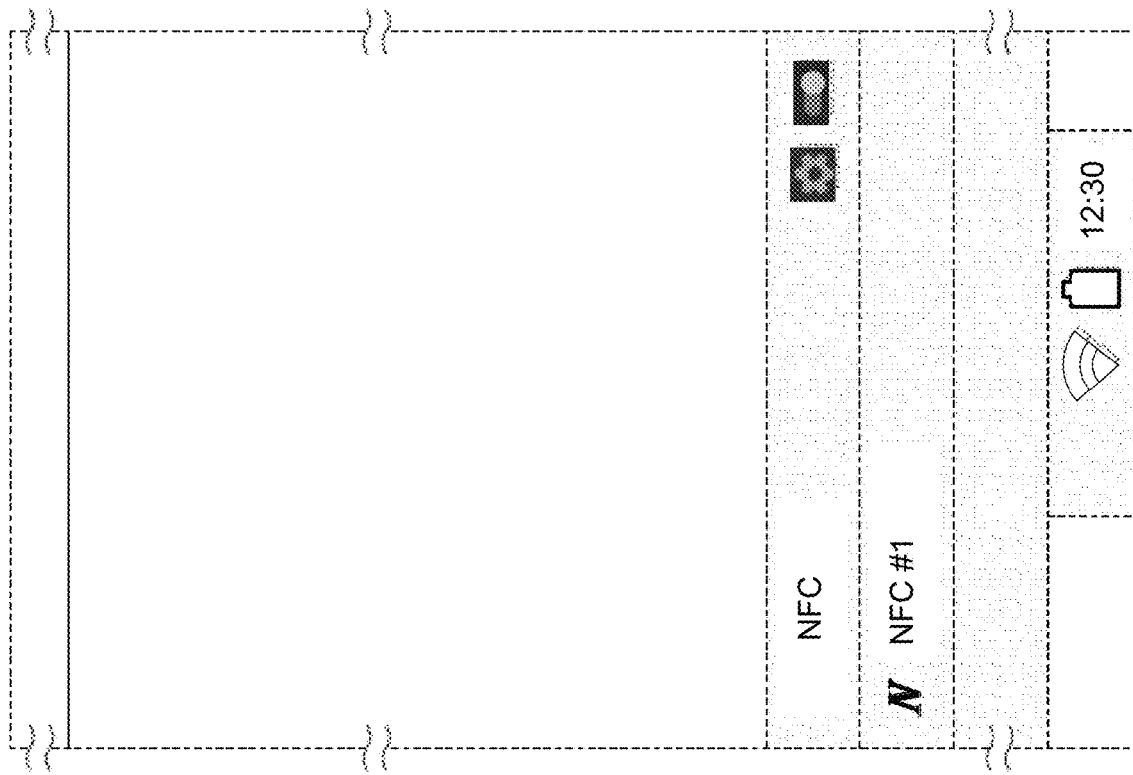
Figure 9C:
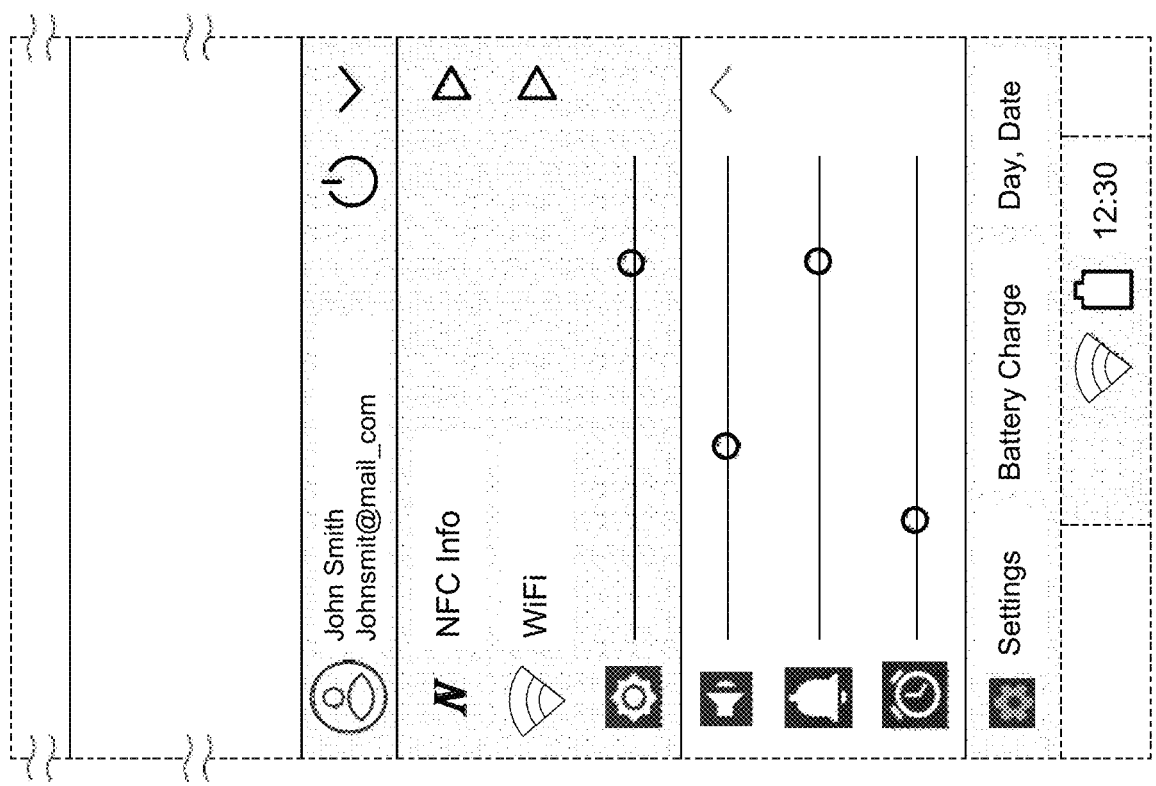

FIGS. 9A-C present further examples of WiFi and NFC settings using respective views 900, 910 and 920. FIGS. 9A and 9B illustrate settings information focusing separately on WiFi and NFC. FIG. 9C illustrates a variation in which the wireless communication settings for WiFi and NFC are provided along with the user account, display and full audio panel.

Figure 10B:
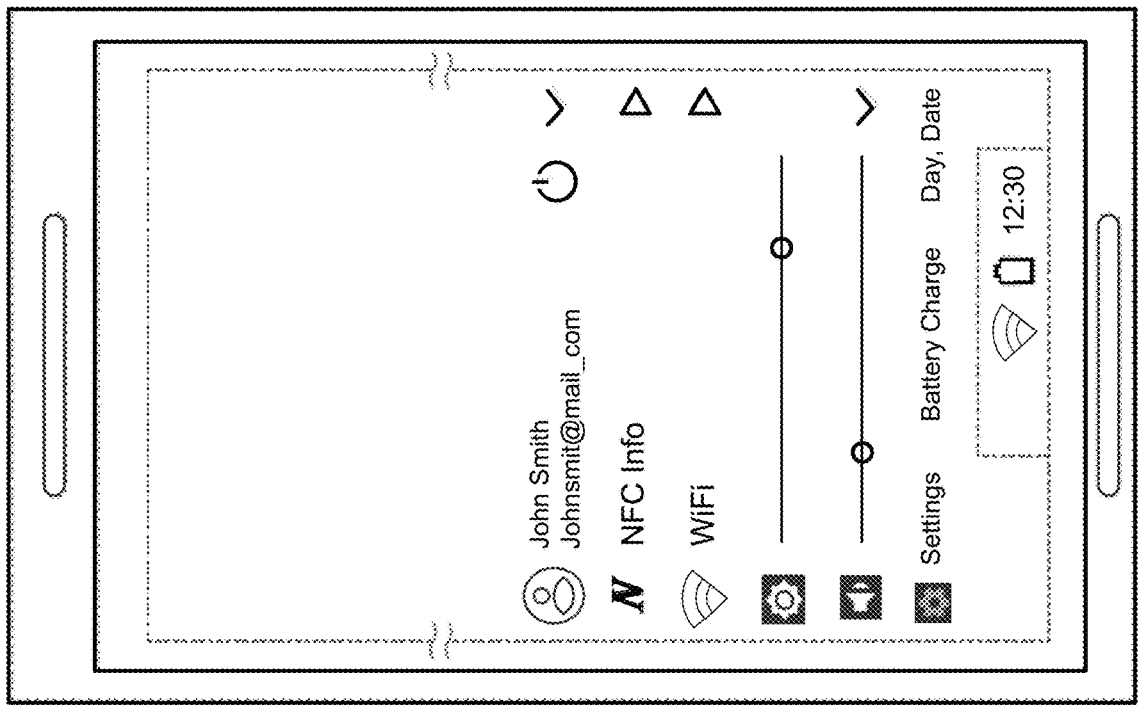
FIGS. 10A-B illustrate variations of the UI as presented on a user device in accordance with aspects of the technology.
Figure 10A:
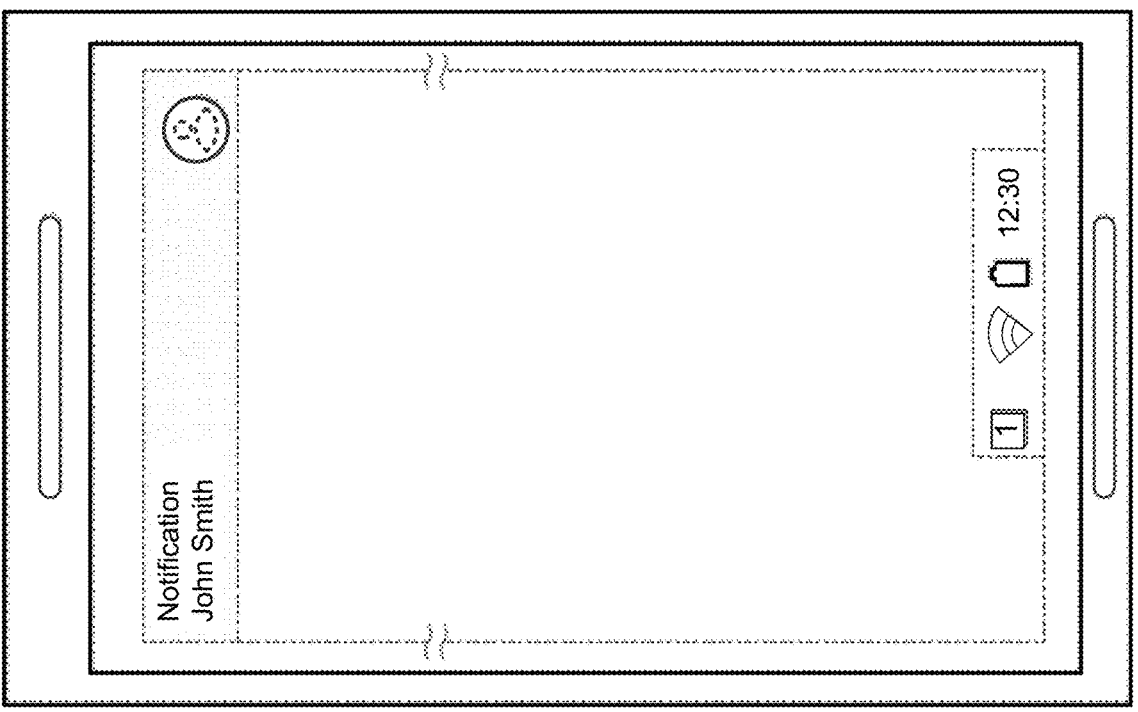

And FIGS. 10A-B illustrate two variations of how the application settings area may look on a UI for user device $100_2$. For instance, in display 1000 of FIG. 10A, the application settings area is hidden aside from the quick information section positioned along a bottom region of the UI, while the notification is positioned along a top region of the UI. And in display 1010 of FIG. 10B, an expanded application settings area is positioned along the lower area of the UI. As indicated by the wavy double lines, the overall UI may have a variable length. And as noted above, the relative sizes of the application settings area and the user notifications area may change according to what notifications and/or settings are to be presented to the user.

Figure 11:
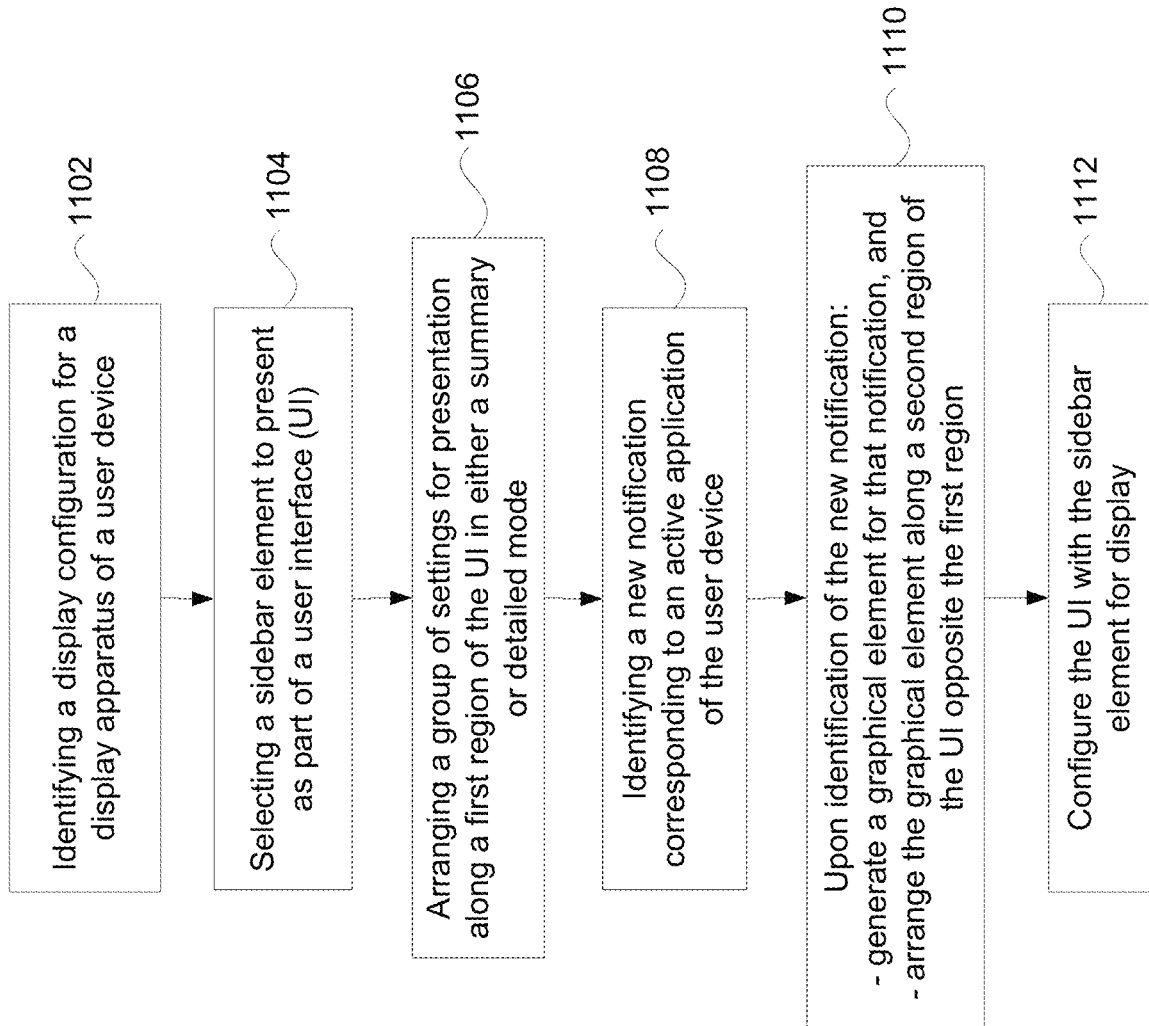
FIG. 11 is a flow diagram of an example method according to aspects of the disclosure.

Finally, FIG. 11 is an example flow diagram 1100 of operational features of the technology described above, which may be performed by one or more processors, either alone or in conjunction with the user interface module, display interfaces and other components of the user device. As shown in block 1102, the process identifies a display configuration for a display apparatus of the user device. At block 1104, the process selects a sidebar or other graphical element to present as part of the UI. At block 1106, the process arranges a group of settings for presentation along a first region of the UI. The settings may be arranged in either a summary or detailed mode according to any of the examples and use cases illustrated in the figures and described herein. At block 1108, the system identifies whether a new notification corresponding to an active application or other program or process of the user device should be presented to the user. Then at block 1110, in response to this identification the system generates a graphical element for that notification and arranges the graphical element along a second region of the UI opposite the first region. For instance, in some examples the first region including the settings is arranged along a bottom section of the UI while the second region including the notification(s) is arranged along a top section of the UI. And in block 1112 the UI is configured, for instance as a sidebar element, for presentation on the display device. The process, including blocks 1108-1112, may repeat as new notifications are identified and/or applications or tasks are completed.

The logic and process flows depicted in the figures and described herein are not limited to a particular order or sequence unless expressly stated. In addition, other steps may be provided, or steps may be eliminated, from the described flows, and other components may be added to, or removed from, the described systems.

Although the technology herein has been described with reference to particular embodiments and scenarios, it is to be understood that these are merely illustrative of the principles and applications of the present technology. It is therefore to be understood that numerous modifications may be made to the illustrative examples and that other arrangements may be devised without departing from the spirit and scope of the present technology as defined by the appended claims.

The invention claimed is:

1. A method for presenting setting and notification information in a user device, the method comprising:
   identifying, by one or more processors of the user device, a display configuration for a display apparatus of the user device;
   arranging, by the one or more processors, a group of settings for presentation in a first region of a user interface, the group of settings being arranged in a detailed mode that displays a set of adjustable features for one or more of the settings in the group of settings;
   arranging, by the one or more processors, a set of user notifications for presentation in a second region of the user interface opposite the first region;
   identifying a new user notification corresponding to an active application of the user device;
   adding the new user notification to the set of user notifications;
   wherein the group of settings collapses from the detailed mode into a summary mode when the set of user notifications exceeds a threshold number of notifications, the summary mode displaying a subset of features from selected settings in the group of settings; and
   configuring the user interface for display on the display apparatus.

2. The method of claim 1, wherein the first region and the second region are disposed along a sidebar element of the user interface.

3. The method of claim 1, wherein the set of user notifications collapses to hide or minimize at least one user notification of the set according to one or more predetermined criteria when the set of user notifications exceeds the threshold number of notifications.

4. The method of claim 1, further comprising applying a do not disturb mode to one or more user notifications of a set of displayed user notifications.

5. The method of claim 1, wherein identifying the display configuration includes detecting an orientation of the display apparatus and, upon detecting a change in the orientation, determining whether to change a length of the displayed user interface.

6. The method of claim 5, wherein when it is determined to change the length of the displayed user interface, the method further includes varying a display mode of at least one user notification or at least one setting in the group of settings.

7. A user device, comprising:
   a display module including a display interface configured to drive a display apparatus of the user device to present graphical and other information to a user;
   a user interface module configured to receive information from one or more user input elements of the user device, and to generate a user interface for presentation to the user;
   one or more processors operatively coupled to the display module and the user interface module, the one or more processors being configured to:
      identify a display configuration for the display apparatus;
      arrange a group of settings for presentation in a first region of the user interface, the group of settings being arranged in a detailed mode that displays a set of adjustable features for one or more of the settings in the group of settings;
      arrange a set of user notifications for presentation in a second side of the user interface opposite the first region;
      identify a new user notification corresponding to an active application of the user device;
      add the new user notification to the set of user notifications;
      wherein the group of settings collapses from the detailed mode into a summary mode when the set of user notifications exceeds a threshold number of notifications, the summary mode displaying a subset of features from selected settings in the group of settings; and
      configuring the user interface for display on the display apparatus.

8. The user device of claim 7, wherein the first region and a second region are disposed along a sidebar element of the user interface.

9. The user device of claim 7, the user device further comprising:
   one or more position and orientation sensors operatively coupled to the display apparatus and configured to generate position and orientation information including rotation data,
   wherein, upon determination that the rotation data indicates rotation of the display apparatus from a first position to a second position, the one or more processors and the user interface module are configured to expand or shrink the displayed user interface in at least one of a vertical direction or a horizontal direction.

10. The user device of claim 9, wherein expansion or shrinking of the displayed user interface includes changing how at least one of user notifications and settings are presented in the user interface.

11. The user device of claim 7, wherein the one or more processors are further configured to:
   collapse the set of user notifications to hide or minimize at least one user notification of the set according to one or more predetermined criteria when the set of user notifications exceeds the threshold number of notifications.

12. The user device of claim 7, wherein the one or more processors are further configured to apply a do not disturb mode to one or more user notifications of a set of displayed user notifications.

13. The user device of claim 7, wherein the one or more processors are further configured to:
   detect an orientation of the display apparatus;
   upon detection of a change in the orientation, determine whether to change a length of the displayed user interface; and when it is determined to change the length of the displayed user interface, vary a display mode of at least one user notification or at least one setting in the group of settings.

14. A non-transitory computer-readable recording medium having instructions stored thereon, the instructions, when executed by one or more processors, cause the one or more processors to perform a method for presenting setting and user notification information in a user device, the method comprising:
   identifying a display configuration for a display apparatus of the user device;
   arranging a group of settings for presentation in a first region of a user interface, the group of settings being arranged in a detailed mode that displays a set of adjustable features for one or more of the settings in the group of settings;

arranging, by the one or more processors, a set of user notifications for presentation in a second region of the user interface opposite the first region;

identifying a new user notification corresponding to an active application of the user device;

adding the new user notification to the set of user notifications;

wherein the group of settings collapses from the detailed mode into a summary mode when the set of user notifications exceeds a threshold number of notifications, the summary mode displaying a subset of features from selected settings in the group of settings; and configuring the user interface for display on the display apparatus.

15. The non-transitory computer-readable recording medium of claim 14, the method further comprising:

collapsing the set of user notifications to hide or minimize at least one user notification of the set according to one or more predetermined criteria when the set of user notifications exceeds the threshold number of notifications.

16. The non-transitory computer-readable recording medium of claim 14, wherein the identifying the display configuration includes detecting an orientation of the display apparatus and, upon detecting a change in the orientation:

determining whether to change a length of the displayed user interface; and varying a display mode of at least one user notification or at least one setting in the group of settings.

* * * * *